(12) United States Patent
Harada et al.

(10) Patent No.: US 7,327,900 B2
(45) Date of Patent: Feb. 5, 2008

(54) IMAGE READING APPARATUS AND RECORDING MEDIUM

(75) Inventors: Eiichi Harada, Nagano (JP);
Michiyoshi Takashima, Nagano (JP);
Tetsuya Mizuno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 705 days.

(21) Appl. No.: 10/795,057

(22) Filed: Mar. 5, 2004

(65) Prior Publication Data
US 2004/0264805 A1    Dec. 30, 2004

(30) Foreign Application Priority Data
Mar. 6, 2003    (JP)    ............................ P2003-059485

(51) Int. Cl.
*G06K 9/36* (2006.01)
(52) U.S. Cl. ...................... 382/289; 382/190; 382/282; 382/295; 358/453; 358/486; 358/488
(58) Field of Classification Search ................ 382/190, 382/282, 291, 293, 295; 358/453, 486, 488, 358/496
See application file for complete search history.

(56) References Cited
U.S. PATENT DOCUMENTS
5,054,098 A * 10/1991 Lee ............................ 382/289
5,280,544 A * 1/1994 Tanaka et al. ............... 382/171
5,854,854 A * 12/1998 Cullen et al. ................ 382/176
6,771,842 B1 * 8/2004 Sakai et al. .................. 382/290

FOREIGN PATENT DOCUMENTS

| JP | 9-321983 | 12/1997 |
|---|---|---|
| JP | 11-341230 | 12/1999 |
| JP | 2001-320572 | 11/2001 |
| JP | 2003-16424 | 1/2003 |

\* cited by examiner

*Primary Examiner*—Yosef Kassa
(74) *Attorney, Agent, or Firm*—John J. Penny, Jr.; Edwards Angell Palmer & Dodge LLP

(57) ABSTRACT

An image read controller for extracting an original portion from an image read by an image reader. The image read controller includes means for extracting a rectangular area containing the area in which the original exists from the read image, inclination detection means for detecting the inclination of the rectangular area, inclination correction means for correcting the inclination of the rectangle in response to the detected inclination, cut width setting means for setting the cut width of each side of the rectangle in response to the detected inclination, and cutting means for cutting the margins of the rectangular area based on the setup cut width of each side to extract the original image.

4 Claims, 6 Drawing Sheets mA = x-y × θ/45
mB = y+θ/45
mC = y
mD = y

IMAGE READING APPARATUS AND RECORDING MEDIUM

BACKGROUND OF THE INVENTION

This invention relates to a flatbed image read system and in particular to an image read system for automatically extracting an original image.

A flatbed image reader for operating a read mechanism for an original placed on an document bed to read data enters widespread use. The flatbed image reader includes a one-dimensional image pickup device (line sensor) as a read mechanism and reads reflected light from the original while moving (subscanning) a carriage on which the image pickup device and a light source are mounted relative to the original, thereby acquiring two-dimensional image information.

Some image read controllers for controlling an image reader include a function of automatically extracting the original portion from the read image and displaying the extracted original portion (automatic extraction function).

In the automatic extraction function, if the original is placed at an angle on the document bed, the inclination of the original placed on the document bed is corrected for display.

FIGS. 5A to 5D are drawings to show how a flatbed image reader reads the image of the original placed on an document bed. As shown in FIG. 5A, light applied from a line light source 113a mounted on a carriage 113 is reflected on an original 151 placed on an document bed 112 or an document bed cover 115 and enters a line sensor 113d through a reflecting mirror 113b and a lens 113c.

Since the line light source 113a and the reflecting mirror 113b are not at the same position, light is applied to the read part in a slanting direction. Thus, in the positional relationship between the line light source 113a and the reflecting mirror 113b shown in FIG. 5A, a shadow of the size responsive to the thickness of the original 151 occurs in the outside portion of the original 151 to be read, particularly at the left of the figure (the lower side of the original) as shown in FIG. 5B. Since the shadow appears on the read image, an image read controller recognizes an image larger than the actual original as the area in which the original exists. Slight noise occurs in the surrounding portions of the original (FIG. 5C).

To remove the shadow and the noise from the original image, the image read controller including the automatic extraction function makes inclination correction to the area recognized as the original and then handles the image whose surrounding portions are cut as the image of the original.

At this time, the lower portion where the shadow occurs is cut larger than any other portion, as shown in FIG. 5D. For example, letting the lower cut width be a and the upper cut width and the left and right cut widths be c, b, and d respectively, a=2 mm and b=c=d=0.5 mm.

The shadow portion appearing on the image occurs because the position of the light source 113a and the read position do not match. Thus, if the original placed on the document bed is not inclined, the major portion of the shadow occurs along the base of the original image, as shown in FIG. 6. Thus, the lower cut width is increased, whereby the image of the original with the shadow and the noise removed can be acquired.

However, if the original is placed on the document bed on the skew, a shadow occurs on the skew across the base and one side of the original after inclination correction is made to the original. Thus, if the lower cut width is increased as in the related art, the shadow portion is contained in the original image on one side. The base portion is cut excessively and it is feared that a part may be missing from the original.

SUMMARY OF THE INVENTION

It is an object of the invention to enhance the accuracy of automatic extraction of an original image in a flatbed image read system.

To the end, according to one aspect of the invention, there is provided an image read controller for extracting an original portion from an image read by an image reader, the image read controller including;

means for extracting a rectangular area containing the area in which the original exists from the read image;

inclination detection means for detecting the inclination of the rectangular area;

inclination correction means for correcting the inclination of the rectangle in response to the detected inclination;

cut width setting means for setting the cut width of each side of the rectangle in response to the detected inclination; and cutting means for cutting the margins of the rectangular area based on the setup cut width of each side to extract the original image.

As the cut widths are changed in response to the inclination of the original, the accuracy of automatic extraction of the original image can be enhanced.

Specifically, the cut width setting means
sets the cut width smaller from a predetermined reference value in response to the degree of the detected inclination for one side of the rectangular area whose inclination is corrected in the main scanning direction of the image reader, whereby the effect of a shadow occurring on a side as the original is inclined can be prevented.

The cut width setting means
sets the cut width larger from a predetermined reference value in response to the degree of the detected inclination for one side of the rectangular area whose inclination is corrected in the subscanning direction of the image reader, whereby excessive cutting of the base portion can be prevented.

To the end, according to another aspect of the invention, there is provided a recording medium storing a program for causing a computer to function as an image read controller for extracting an original portion from an image read by an image reader, the recording medium storing the program for causing the computer to execute the steps of:

extracting a rectangular area containing the area in which the original exists from the read image;

detecting the inclination of the rectangular area;

correcting the inclination of the rectangle in response to the detected inclination;

setting the cut width of each side of the rectangle in response to the detected inclination; and cutting the margins of the rectangular area based on the setup cut width of each side to extract the original image.

BRIEF DESCRIPTION OF THE DRAWINGS

FIG. 3 is a flowchart to show a processing example of an extraction processing section 202a.

DETAILED DESCRIPTION OF THE PREFERRED EMBODIMENT

Referring now to the accompanying drawings, there is shown a preferred embodiment of the invention.

Figure 1:
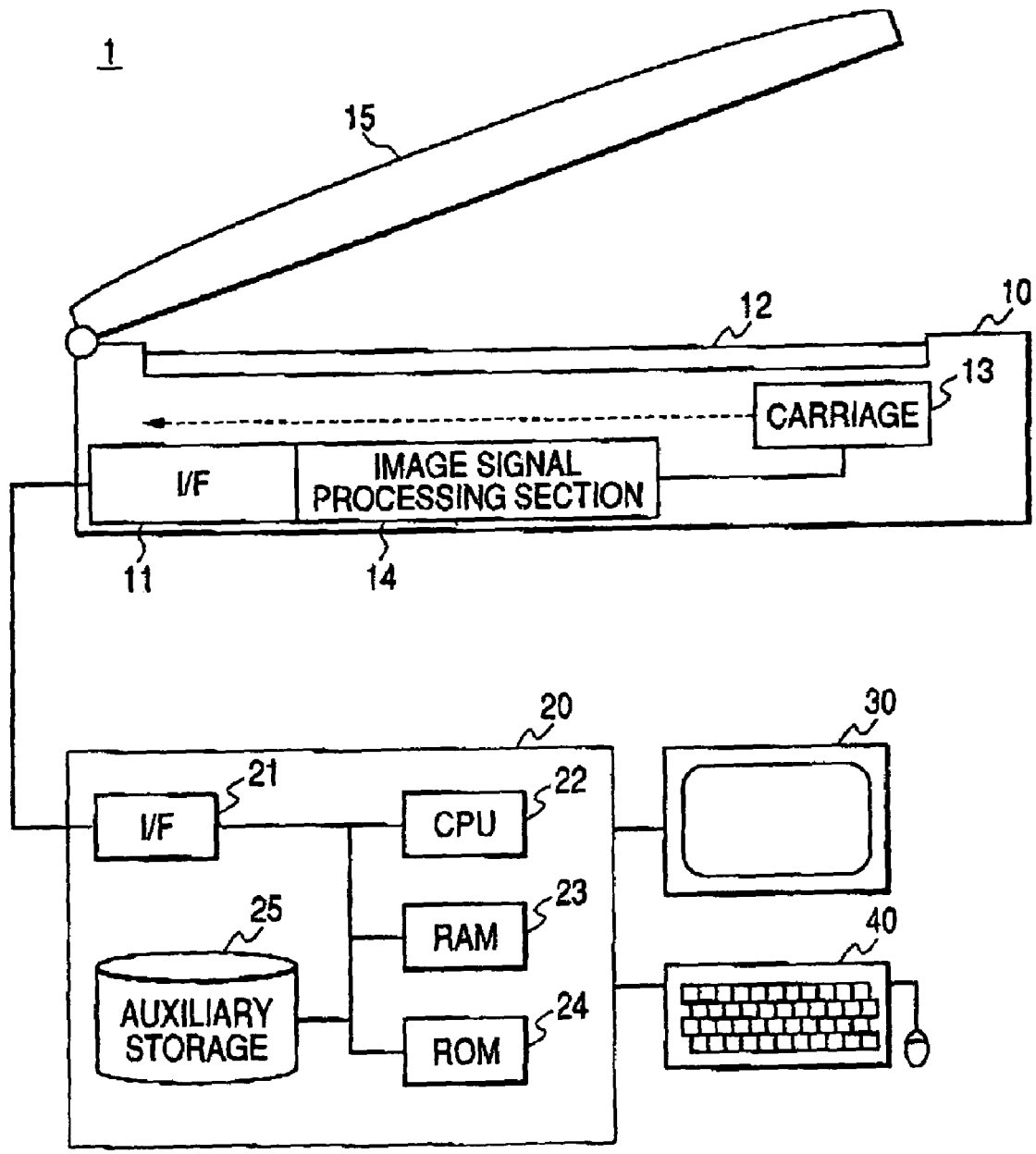
FIG. 1 is a block diagram to show the configuration of an image read system.

FIG. 1 is a block diagram to show the configuration of an image read system. As shown in the figure, an image read system 1 is made up of an image reader 10 and a host computer 20 for controlling the image reader 10 and performing image processing. The image reader 10 and the host computer 20 are connected via interfaces 11 and 21 for making it possible to conduct bidirectional communications with each other.

The image reader 10 is a flatbed image reader for reading a reflected original placed on an document bed.

The image reader 10 includes: a transparent document bed 12 to place an original on the top of a box-shaped cabinet; a carriage 13 for moving in the arrow direction in the figure (subscanning direction) for reading reflected light from the original placed on the document bed 12 while applying light to the original; an image processing section 14 for performing digital conversion of the reflected light signal read by the carriage 13 and performing processing of correction, etc., and then converting the signal into image data; and an document bed cover 15 to cover the document bed.

The carriage 13 includes a line light source, a reflecting mirror, a lens, and a line sensor and is reciprocated in the subscanning direction by a drive mechanism (not shown).

The host computer 20 can be implemented as a general-purpose personal computer including a CPU 22, RAM 23, ROM 24, auxiliary storage 25, etc. A monitor 30 for displaying an image, an input unit 40 for accepting a command from the user, and the like are connected to the host computer 20.

A control program for the image reader is installed in the host computer 20. As the CPU 22 executes the program, an image read control section is constructed in the host computer 20 and the host computer 20 functions as an image read controller.

Figure 2:
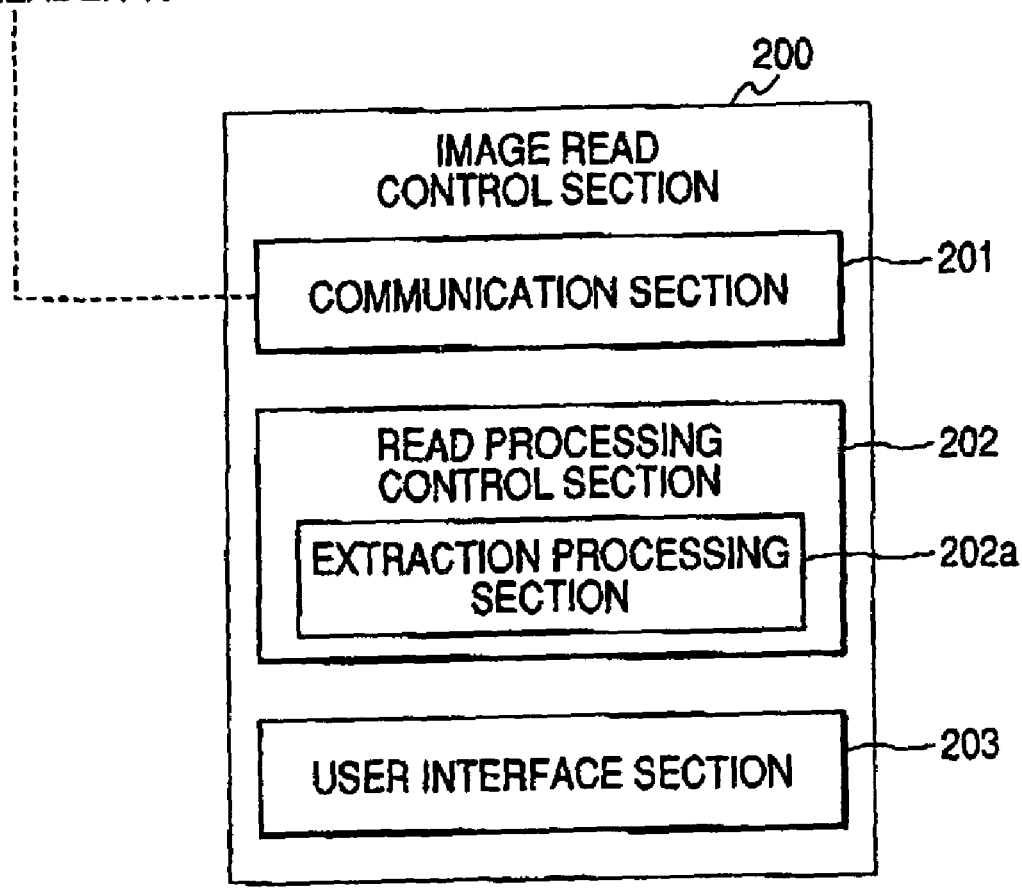
FIG. 2 is a block diagram to show the functional configuration of an image read control section.

FIG. 2 is a block diagram to show the functional configuration of an image read control section 200 constructed in the host computer 20.

As shown in the figure, the image read control section 200 includes a communication section 201 for conducting communications with the image reader 10, a read processing control section 202 for controlling image read processing in the image reader 10, and a user interface section 203 for accepting a command from the user and presenting information concerning image read processing.

The image read processing in the image reader 10 is separated into scanning processing of actual image read processing and prescanning processing. The prescanning processing is read processing of an image of the original placed on the document bed 12 in a short time with the resolution reduced prior to the scanning processing. The read processing control section 202 extracts the original portion from the image read in the prescanning processing and previews the extracted original portion.

To do this, the read processing control section 202 includes an extraction processing section 202a for performing extraction processing of the original portion from the image read in the prescanning processing.

The extraction processing section 202a converts the read image data into binary data and determines the area in which the original exists. At this time, an area larger than the actual original is determined to be the area in which the original exists because of the effect of the shadow occurring at the read time. Noise occurs in the surroundings of the image of the original. Thus, the extraction processing section 202a cuts the surrounding portions from the area recognized as the image of the original to extract the original portion.

The shadow occurring at the read time becomes large on one side in the subscanning direction based on the positional relationship between the line light source and the read position. Thus, the part where a shadow much occurs changes with the inclination degree of the original placed on the document bed. That is, if the original is not inclined, a shadow occurs along the portion corresponding to the base. As the original is inclined, the effect of the shadow appears in the side direction positioned on the lower side; on the other hand, the effect of the shadow in the portion corresponding to the base lessens. The base and the top are replaced with each other depending on the positional relationship between the line light source and the read position.

Then, in the embodiment, the cut width of each side is adjusted in response to the inclination degree of the original placed on the document bed.

Figure 3:
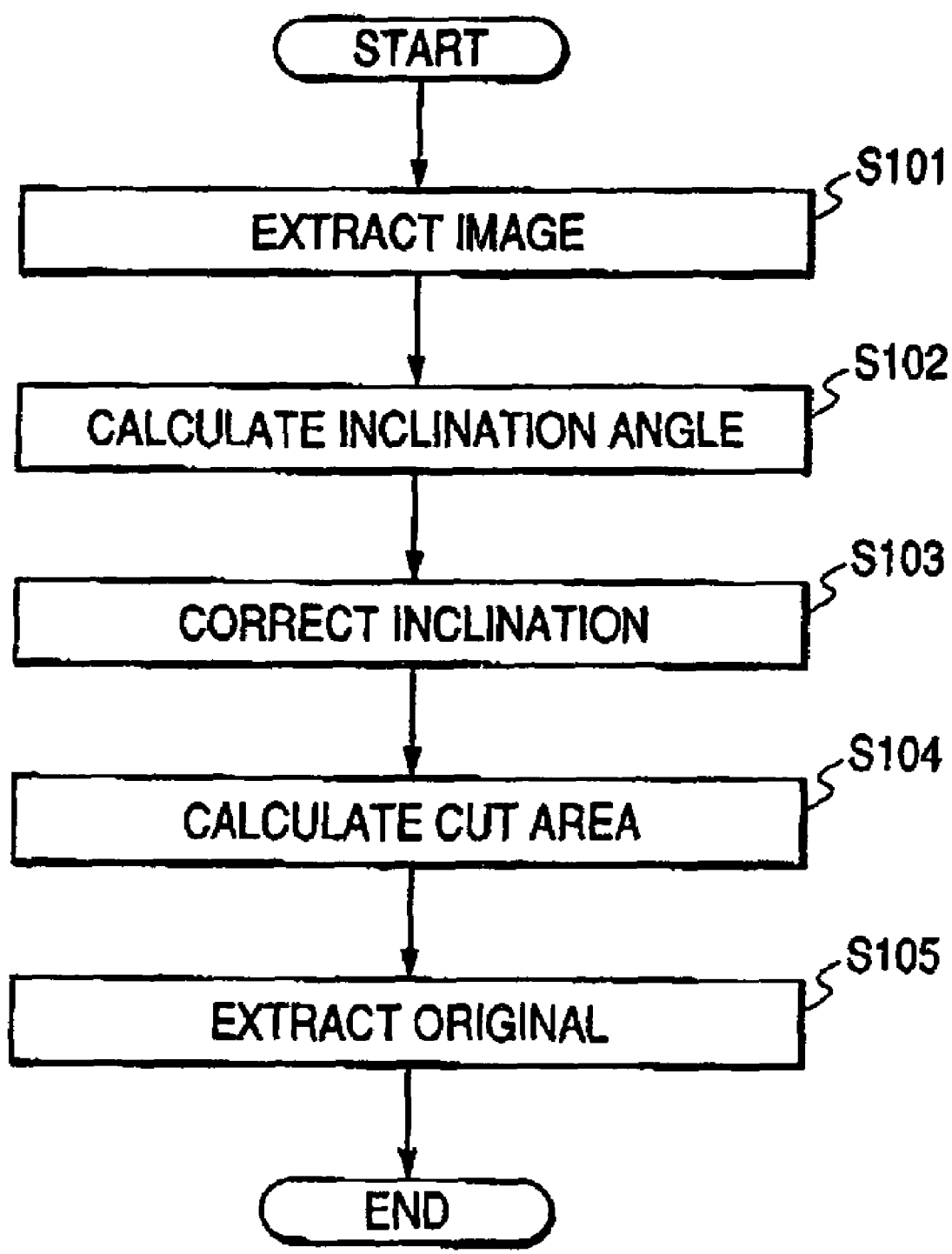

A processing example of the extraction processing section 202a will be discussed with reference to a flowchart of FIG. 3.

The extraction processing section 202a converts the image data read by the image reader 10 into binary data and extracts the rectangular area containing the area in which the original exists (S101).

Figure 4A:
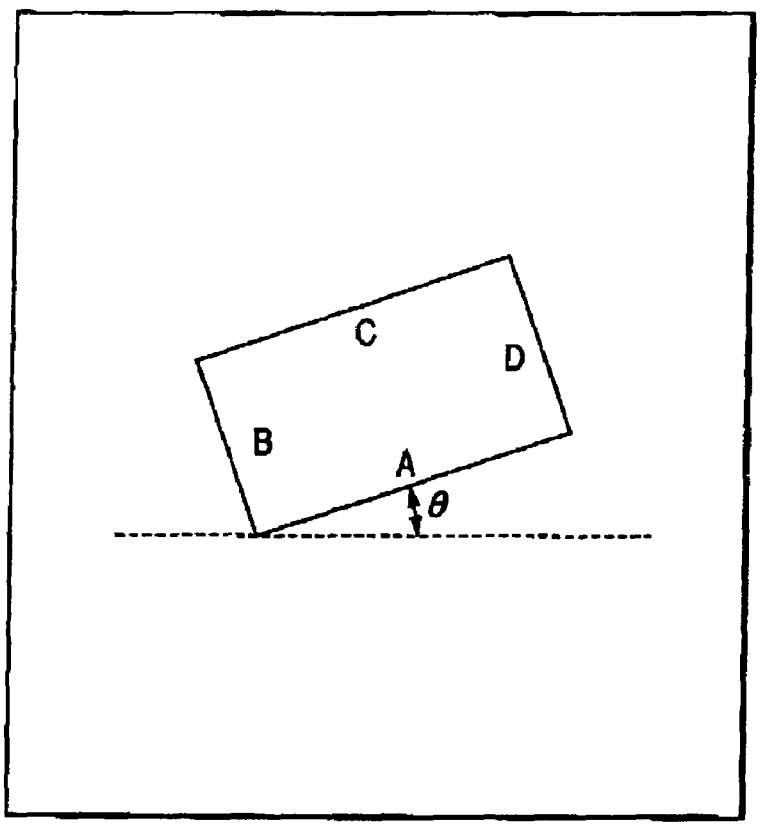
FIGS. 4A and 4B are drawings to describe image extraction.

Next, the inclination of the extracted rectangle is found (S102). The inclination is angle θ which the base forms with the main scanning direction. That is, the side forming the narrower angle with the main scanning direction (side A), of the sides between which the lower apex is sandwiched (sides A and B) is adopted as the base and the inclination is found between 0 degrees and 45 degrees, as shown in FIG. 4A If the inclination exceeds 45 degrees, the side as the base is replaced At this time, if the number of the lower apexes is two, the inclination is zero (angle θ=0). In the description to follow, the side opposite to the side A is side C. The side forming the wider angle with the main scanning direction, of the sides between which the lower apex is sandwiched is side B, and the side opposite to the side B is side D.

The inclination of the rectangular area containing the area in which the extracted original exists is corrected based on the found angle θ (S103). That is, the rectangular area is rotated −θ so that the base A becomes the lower side of the image of the original and becomes parallel with the main scanning direction.

Figure 4B:
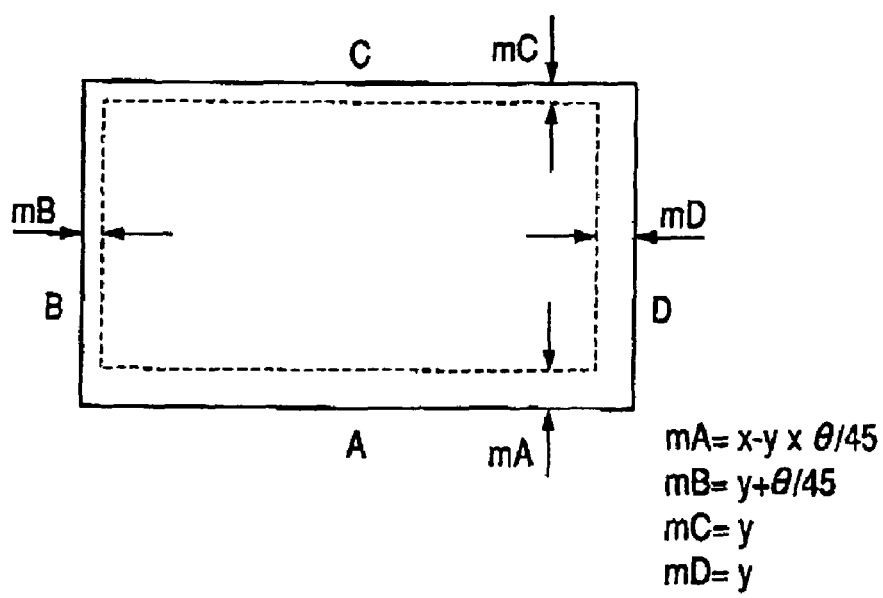
Figure 5A:
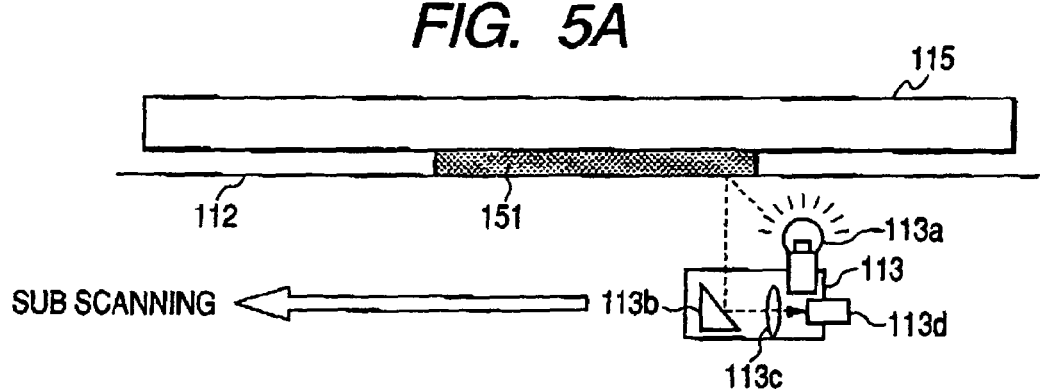
FIGS. 5A to 5D are drawings to show how the image of the original placed on an document bed is read.
Figure 5B:
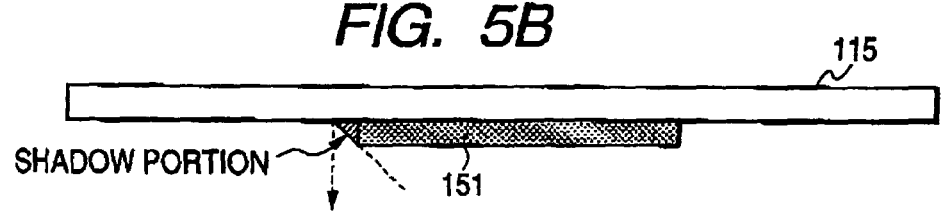
Figure 5C:
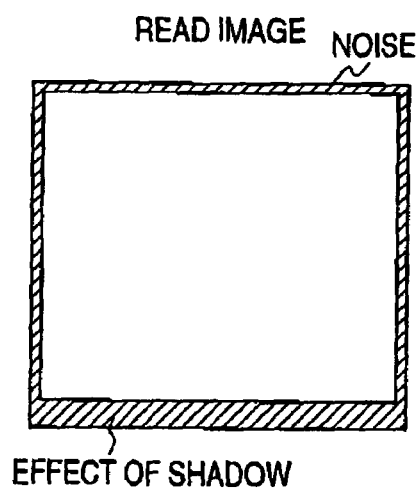
Figure 5D:
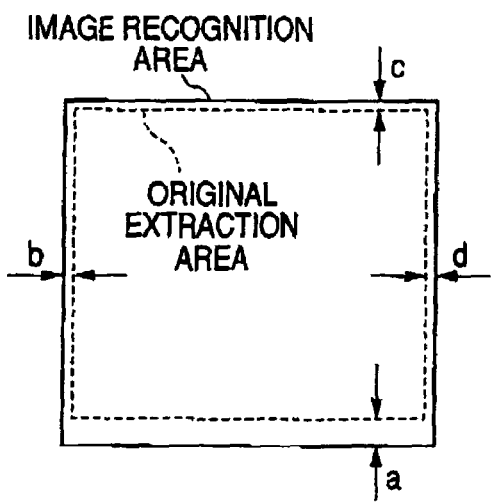
Figure 6:
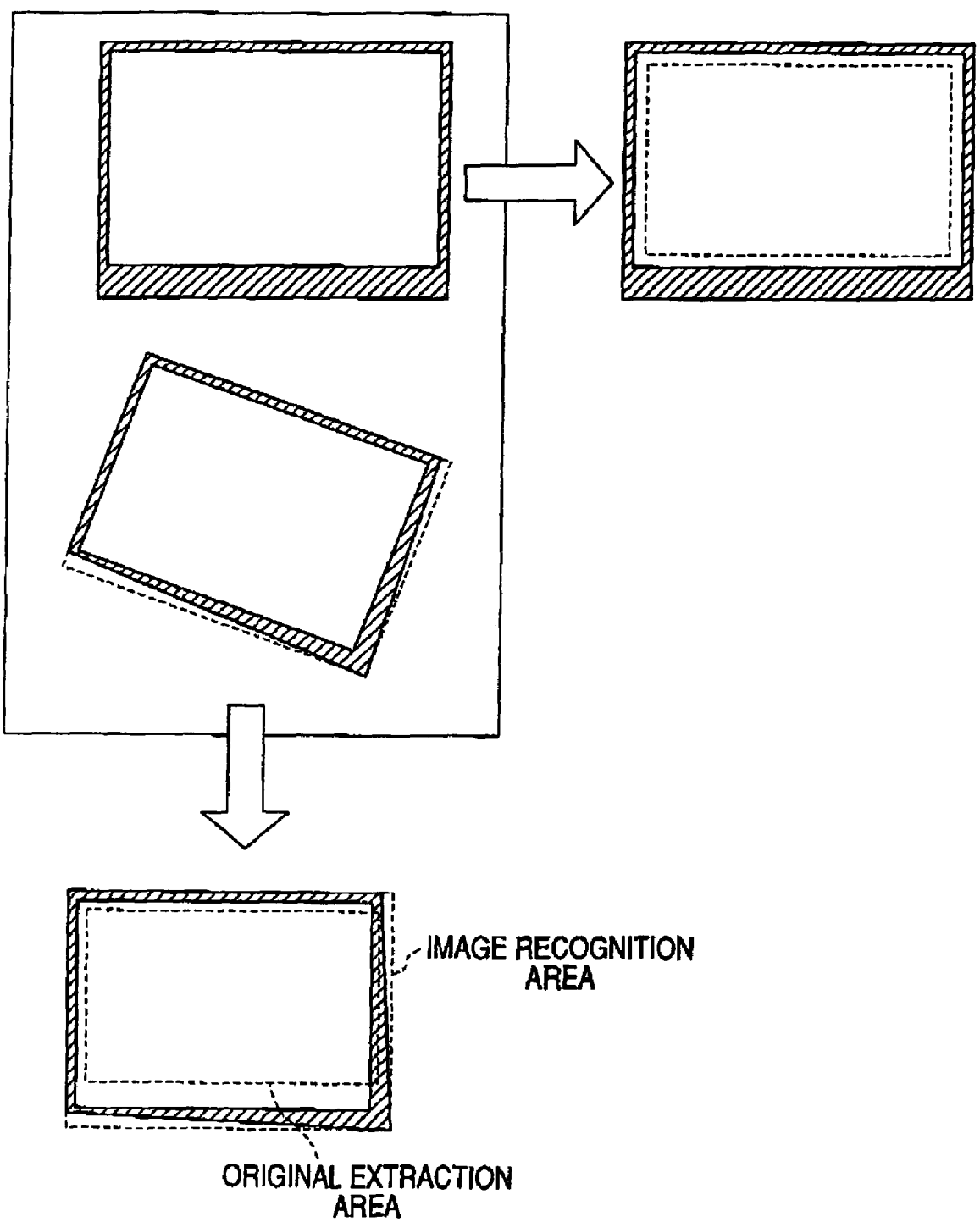
FIG. 6 is a drawing to show shadows and noise appearing on the image of an original.

Next, for the image of the original whose inclination is corrected, the cut width of each side is set based on the found angle θ (S104). The cut width of each side is set as follows:

$$mA = x - y \times \theta/45$$

$$mB = y + \theta/45$$

$$mC = y$$

$$mD = y$$

where mA, mB, mC, and mD are the cut widths of the sides A, B, C, and D, x is the reference value of the base, and y is the reference value of any side other than the base, as shown in FIG. 4B.

Accordingly, as the inclination increases, the cut width of the base becomes shorter from the reference value and the cut width of the side which becomes the lower side becomes longer from the reference value. On the other hand, the reference value is used intact as the top and the side which becomes the upper side scarcely receiving the effect of the shadow. Of course, the cut width setting method is not limited to the expressions.

The reference value x of the base can be set to 2.0 mm, for example, and the reference value y of any side other than the base can be set to 0.5 mm, for example. However, the shadow area changes with the thickness of the original. Thus, the reference values x and y may be changed in response to the thickness of the original. For example, a table recording the correspondence between the types of originals and the thicknesses of originals is provided and at the preview time, the type of original is accepted from the user, whereby the thickness of the original can be acquired.

What is claimed is:

1. An image read controller for extracting an original portion from an image read by an image reader, said image read controller comprising:
    an extracting unit that extracts a rectangular area containing an area in which the original exists from the read image;
    an inclination detection unit that detects an inclination of the rectangular area;
    an inclination correction unit that corrects the inclination of the rectangle in response to the detected inclination;
    a cut width setting unit that sets the cut width of each side of the rectangle in response to the detected inclination; and
    a cutting unit that cuts the margins of the rectangular area based on the setup cut width of each side to extract the original image.

2. The image read controller as claimed in claim 1 wherein the cut width setting unit sets the cut width larger from a predetermined reference value in response to the degree of the detected inclination for one side of the rectangular area whose inclination is corrected in the main scanning direction of the image reader.

3. The image read controller as claimed in claim 1 wherein the cut width setting unit sets the cut width smaller from a predetermined reference value in response to the degree of the detected inclination for one side of the rectangular area whose inclination is corrected in the subscanning direction of the image reader.

4. A computer-readable recording medium storing a program for causing a computer to function as an image read controller for extracting an original portion from an image read by an image reader, said computer-readable recording medium storing the program for causing the computer to execute the steps of:
    extracting a rectangular area containing the area in which the original exists from the read image;
    detecting the inclination of the rectangular area;
    correcting the inclination of the rectangle in response to the detected inclination;
    setting the cut width of each side of the rectangle in response to the detected inclination; and
    cutting the margins of the rectangular area based on the setup cut width of each side to extract the original image.

* * * * *